(12) United States Patent
Smith et al.

(10) Patent No.: US 6,699,042 B2
(45) Date of Patent: Mar. 2, 2004

(54) METHOD OF MAPPING GOING

(75) Inventors: John Justin Smith, Haynes West End (GB); Martin Peters, Melboure (AU)

(73) Assignee: Turftrax Group Limited, Wiltshire (GB)

( * ) Notice: Subject to any disclaimer, the term of this patent is extended or adjusted under 35 U.S.C. 154(b) by 0 days.

(21) Appl. No.: 10/131,908

(22) Filed: Apr. 25, 2002

(65) Prior Publication Data

US 2003/0001855 A1 Jan. 2, 2003

(30) Foreign Application Priority Data

May 1, 2001 (GB) .............................................. 0110686

(51) Int. Cl.[7] .............................................. G09B 29/00
(52) U.S. Cl. ...................................................... 434/150
(58) Field of Search ................................. 434/219, 130, 434/150, 151, 152, 153, 299, 255

(56) References Cited

U.S. PATENT DOCUMENTS 5,442,293 A * 8/1995 Lange ......................... 324/332
5,825,188 A * 10/1998 Montgomery et al. ...... 324/357
6,041,582 A * 3/2000 Tiede et al. ............... 56/10.2 A
6,199,000 B1 * 3/2001 Keller et al. ................... 701/50
6,236,907 B1 * 5/2001 Hauwiller et al. .......... 700/283
6,349,775 B1 * 2/2002 van der Lely et al. .......... 172/2

OTHER PUBLICATIONS

"Review of Devices Currently Available for Assessing Racetrack Conditions", Project Number PTP–5A, Rural Industries Research and Development Corporation, 1997.*

* cited by examiner

Primary Examiner—Kart Fernstrom
(74) Attorney, Agent, or Firm—Welsh & Katz, Ltd.

(57) ABSTRACT

A method of mapping the going conditions for a racecourse comprises surveying the racecourse soil conductivity over the course using soil conductivity measuring means and mapping the conductivity data produced by the conductivity measuring means according to the locations at which the conductivity data were obtained, so as to produce a map of the racecourse showing variations in soil conductivity. The racecourse is then sectioned along its length so as to produce a series of zones, wherein the variations shown in the soil conductivity map are utilized in choosing the sizes of the zones, the going condition in each zone is determined and a map of the racecourse displaying the going conditions along the racecourse is produced.

13 Claims, 6 Drawing Sheets

COURSE NAME: CHELTENHAM
INSPECTED BY ________________ DATE ________
OFFICIAL GOING ________________

| | HEAVY | SOFT | GOOD-SOFT | GOOD | GOOD-FIRM | FIRM |
|---|---|---|---|---|---|---|
| 1 | | | | | | |
| 2 | | | | | | |
| 3 | | | | | | |
| ... | | | | | | |
| 40 | | | | | | |

| | HEAVY | SOFT | GOOD-SOFT | GOOD | GOOD-FIRM | FIRM |
|---|---|---|---|---|---|---|
| 41 | | | | | | |
| 42 | | | | | | |
| ... | | | | | | |
| 80 | | | | | | |
| 101 | | | | | | |
| 102 | | | | | | |
| ... | | | | | | |
| 116 | | | | | | |

WEATHER & ADDITIONAL INFORMATION

CROSS COUNTRY COURSE

FIG. 5

Going Entry:

| ID No. | | | | | | | |
|---|---|---|---|---|---|---|---|
| 1 | O | O | O | O | O | O | O |
| 2 | O | O | O | O | O | O | O |
| 3 | O | O | O | O | O | O | O |
| 4 | O | O | O | O | O | O | O |
| 5 | O | O | O | O | O | O | O |
| 6 | O | O | O | O | O | O | O |
| 7 | O | O | O | O | O | O | O |
| 8 | O | O | O | O | O | O | O |
| 9 | O | O | O | O | O | O | O |
| 10 | O | O | O | O | O | O | O |
| 11 | O | O | O | O | O | O | O |
| 12 | O | O | O | O | O | O | O |
| 13 | O | O | O | O | O | O | O |
| 14 | O | O | O | O | O | O | O |
| 15 | O | O | O | O | O | O | O |
| 16 | O | O | O | O | O | O | O |
| 17 | O | O | O | O | O | O | O |
| 18 | O | O | O | O | O | O | O |

*FIG. 6*

METHOD OF MAPPING GOING

The present invention relates to a method of mapping the going conditions for a racecourse. More particularly, in circumstances where the going varies between different parts of the course, the present invention allows the production of geographically accurate maps displaying the differing going conditions.

Currently, the going (a term for the state of the ground) of a horseracing course is assessed by a person known as the Clerk of the Course, who is appointed by the racecourse, and registered by the Jockey Club for the purpose of arranging fixtures, and reporting the ground conditions prior to a race. Going is subjectively tested by the Clerk starting at one end of the racecourse and walking to the other end, while periodically testing the ground by poking or prodding the turf with a stick or other sharp object and recording mentally the penetration of the stick into the ground. On reaching the other end the Clerk makes a written assessment of the going over the course as a whole. The possible assessments are:
1: Hard
2: Hard, Firm in Places
3: Firm, Hard in Places
4: Firm
5: Firm, Good to Firm in Places
6: Good to Firm, Firm in Places
7: Good to Firm
8: Good to Firm, Good in Places
9: Good, Good to firm in Places
10: Good
11: Good, Good to Soft in Places
12: Good to Soft, Good in Places
13: Good to Soft
14: Good to Soft, Soft in Places
15: Soft, Good to soft in Places
16: Soft
17: Soft, Heavy in Places
18: Heavy, Soft in Places
19: Heavy
20: Unraceable As a result, an interested party wishing to know the current going conditions for a racecourse has to rely on a generalised description, for example "soft, good to soft in places", no information being available as to what parts, if any, of the course were considered to differ from the stated overall going.

According to a first aspect of the present invention a method of mapping the going conditions for a racecourse is provided comprising the steps of:
  a. surveying the racecourse soil conductivity over the course using soil conductivity measuring means;
  b. mapping the conductivity data produced by the conductivity measuring means according to the locations at which the conductivity data were obtained, so as to produce a map of the racecourse showing variations in soil conductivity;
  c. sectioning the racecourse along its length so as to produce a series of zones, wherein the variations shown in the soil conductivity map are utilized in choosing the zones;
  d. determining the going condition in each zone; and
  e. producing a map of the racecourse displaying the going conditions along the racecourse.

In choosing the zones sizes and/or location may be chosen.

In carrying out step (c) other factors may also be taken into account in choosing the zones.

Preferably, the racecourse is sectioned such that parts of the course showing greater variation in soil conductivity are provided with zones of smaller size.

For at least part of the racecourse the zones chosen may result in the course being sectioned along its width as well as its length.

Preferably, the racecourse is be sectioned by placing zone markers around the course according to the desired positioning of the zones. For example, each zone marker may represent the centre of a side edge of a zone.

The location of each zone marker may then be recorded, this data being used to create a base map of the racecourse showing the position of the various zones, the base map being for subsequent use in producing the going conditions map.

The production of a map showing going conditions in step (e) may then comprise shading or colouring the zones of the base map according to the going information received, different shades or colours equating to different going conditions.

The location of any furlong markers and start and finish points may also be recorded and displayed on the going condition map.

Preferably, all location data is obtained using a GPS receiver in communication with a data processor equipped with suitable software.

The going condition map may exaggerate to a constant scale the width of the racecourse in order to facilitate visual interpretation of the map.

According to a second aspect of the present invention, a going map produced according to the first aspect of the present invention is provided.

According to a third aspect of the present invention a base map produced utilizing steps (a) to (c) of the first aspect of the present invention is provided.

Solely by way of example, one embodiment of the invention will now be described with reference to the following drawings, in which.

In the drawings various stages or features of the steps of a method of mapping the going conditions of a racecourse are generally shown.

Mapping the going conditions for a racecourse according to the method of the present invention first requires a soil conductivity survey of the racecourse to be carried out, in order to produce a soil conductivity map for the course. The survey is preferably carried out using the conductivity measuring apparatus described in Patent Application GB 0106531.7, the disclosure of which is incorporated herein by reference.

GB 0106531.7 describes an apparatus having (a)a sensor for measuring conductivity of soil by electromagnetic induction, (b)means for determining the location of the device on the area of ground being mapped, and (c) means for receiving and processing the conductivity and location data produced by (a) and (b). Preferably the sensor is an EM38 sensor, the location determining means is global positioning satellite (GPS) receiver, and the means for receiving and processing the data is a handheld or laptop personal computer (HPC and LPC respectively) equipped with suitable software. In a particularly preferred embodiment the apparatus is mounted on a rough terrain vehicle and trailer combination.

The survey is carried out as follows. First the boundary of the racecourse is scanned. Then the course itself is scanned by travelling the course in forward and back alternating rows, for example approximately six meters apart although wider or narrower spaced rows may be used where local knowledge or other conditions imply. The data from the EM38 scan is then processed in combination with the data from the GPS receiver by the HPC or LPC using a suitable geographical software package, operable in Win9x/NT or CE (Registered Trade Marks of Microsoft Corporation) formats (again as fully described in GB 0106531.7), so as to rapidly provide the surveyor with a high resolution soil conductivity map of the racecourse under investigation.

The location data obtained from the boundary scan is stored separately from the rest of the location data obtained in the conductivity survey, such that the boundaries of the racecourse can be constructed in later maps without having to display the rest of the location data obtained in the conductivity survey.

Next, the soil map is analysed and areas of high variability in conductivity, which indicate likely changes in ground conditions, are identified visually. Also, during this initial study, anomalies are sought which may indicate potential problem areas, such as underground water pipes, drainage backfill etc. Subsequent to this analysis, the area is sectioned or gridded into zones (also called going zones), zones being positioned in order that changes in going within a zone are unlikely. Zones are positioned based on the soil conductivity map, the anomalies mentioned above and any additional relevant factors. Such additional factors may indicate that the course be sectioned widthways as well as lengthways. Factors that might indicate that such sectioning should be applied would be that two types of course use the same home straight, for example a hurdle course and a chase course, or that, historically, advantages appear to have been gained, under certain soils conditions, of a horse choosing to finish on one particular side of the course.

Sectioning of the racecourse is achieved by placing markers at intervals around the side of the course, each marker representing the centre of the side edge of a going zone, the point at which a marker is placed being referred to herein as a going point.

Figure 1:
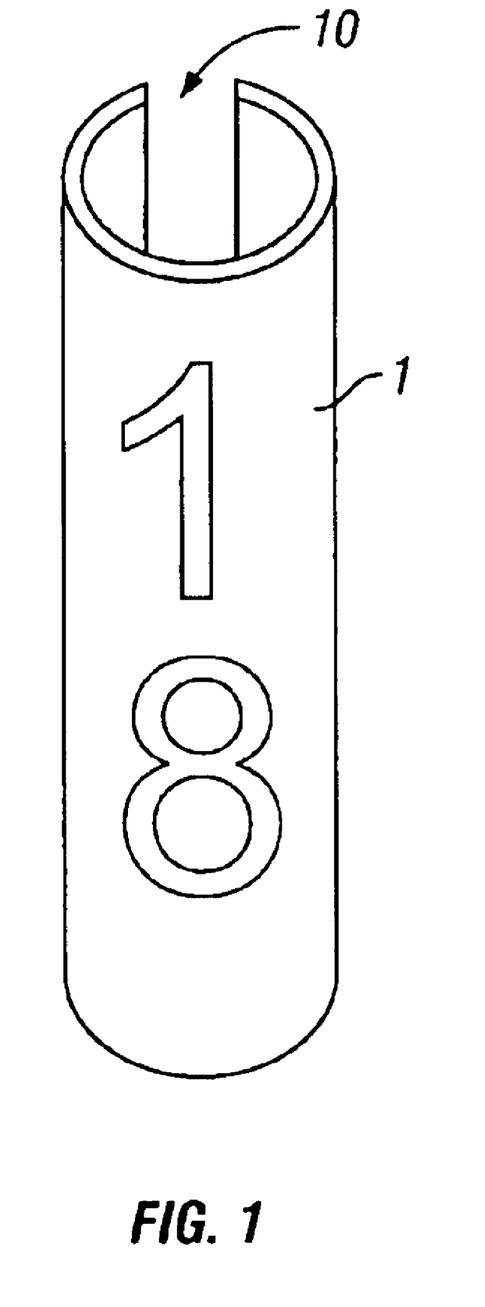
FIG. 1 is a perspective view of a zone marker suitable for use in the present invention.

Referring now to FIG. 1, a suitable zone marker 1 is shown comprising a plastic tube having a longitudinal slit 10 to allow easy fitting and removal from a racecourse running rail, the outer surface of the tube displaying a clearly visible number.

A protocol is followed for the general sectioning of the racecourse. Areas of high variability in terms of conductivity, as identified by the soil conductivity map, are considered to require going zones 40 m long. Corners are also considered to require 40 m long zones. Areas of intermediate change in conductivity are allocated 60 m long zones, and areas of minimal change are allocated 70–80 m long zones. If areas containing anomalies have been identified the spacing of the zone markers is adjusted such that the anomaly will fall fully within one going zone. Having decided upon the desired spacing, and after collaboration with the Clerk of the Course, the first zone marker (marked with the number one) is placed at a distance from an end of the racecourse corresponding to half the allocated first zone length, such that the marker is located at least substantially in what will be the centre of the first zone (ie. if the desired length of the first zone is 80 m, then the first marker is placed 40 m from the end of the racecourse). Distances may be measured using a trundle wheel. Generally, up to 140 markers may be used on a large course, with as little as 70 at a smaller venue.

The markers are clipped on to the running rail, which marks the boundary of the racecourse, at approximately half the full height of the running rail. This allows easy identification of the markers, and facilitates correct repositioning of the markers should running rail be changed.

Once the zone markers have been placed around the racecourse, the position of each marker is geo-referenced so as to obtain a complete set of geo-referenced going points from which a map accurately showing going zones can subsequently be constructed. Having geo-referenced the zone markers the positions of all starts finishes and furlong markers are also geo-referenced such that a full representation of the course can be provided.

The same equipment used for producing the soil variability mapping is used for marker geo-referencing. The software used is preferably FarmWorks Site Mate sold by CTN Data Service Inc., 6795S, State Road 1, Hamilton, Ind. 46742-0250 USA (tel. 1-800-225-2848), although Starpal Software sold by Starpal Inc., 2531 Wapiti Road, Fort Collins, Colo. 80525 USA or any other suitable software package may also be used for this operation.

The GPS receiver is started. This may be either a CSi GBX receiver as described in GB 0106531.7, or any other suitably accurate GPS system such as any Trimble GPS receivers sold by Trimble Navigation Europe Ltd., Trimble House, Meridian Office Park, Osborn Way, Hook, Hampshire, England tel. 01256 746200) the Encore M12 marketed by Motorola GPS Products, c/o BFI Optilas GmBH, Lilienthalstr, 14, D-85391, Neufahrn, Germany (www.encore.motorla.com), and the Ashtech G12 sold by Ashtech, 117 Okifer road, Sunnyvale, Calif. 94086, USA (tel. 408-524-1400, fax 408-524-1500).

Site Mate is then started. This is preferably run on a Husky HPC sold by Handheld Systems Ltd., 4300 N E Fremont, Suite 250, Portland, Oreg., 97213 (tel 503-282-2857, fax 503-281-7827) mounted on the rough terrain vehicle but any win9x/NT laptop may be used. The Site Mate default screen is opened and scouting (GPS integration and movement logging) is started, by using the file pull down and selecting open scouting, enabling a history of the GPS data stream to be written to file.

Once a GPS has been acquired, and a log file has been generated, the software must then be set up to allow point data referencing. This is achieved by setting the data type to point type and manual logging, after which the start (Action) button is clicked. Thereafter, activating the log button will cause the software to record the point and assign it an arbitrary value, usually starting with 1 and ending with the last logged point. Once a point has been logged, a marker will appear indicating that the point has been referenced. This allows re-navigation back to the point should it be necessary.

Once all the going points have been referenced, a new file is preferably opened for recording the positions of the furlong markers and an additional file is then used to record the position of the starts and finishes when switching to referencing start and finish markers, such that all going points are saved under one file, the positions of all furlong markers are saved under another file, and so on. The use of one file is possible, but creates confusion by including superfluous information in some maps. The use of separate files, by comparison, allows the user to readily select the information to be displayed on any map.

Upon completion of the geo-referencing steps all data is checked for integrity and any corrupted data is re-acquired. The data may then be transferred to a PC located off site for processing using the Farm Works Site Pro software package also sold by CTN Data Service Inc. or any other suitable geographical software so as to present a map of the racecourse displaying the position of each zone, such a map being referred to herein as a base map.

The map is constructed, using the geographical software, by processing the geo-reference data obtained on-site. The boundaries of the racecourse are constructed from the boundary data obtained in the conductivity survey. The going point data can then be processed to construct and display zones equidistant about each referenced point, such that if one hundred going points were referenced at the racecourse site, one hundred zones would be displayed, each in their correct position around the course. Equally, if desired, the start and finish points and furlong markers can be displayed in their correct positions. However, each set of data (going point data, boundary data, start and finish data) is preferably kept separate, allowing the user to select which sets will be displayed.

Where the course is particularly large and long, using an exact map produced from the raw geo-reference data for the purpose of going representation may be impractical, as identifying the various zones may be difficult due to their small width. This problem can be particularly acute where the racecourse has been sectioned widthways. In these instances the width of the course is exaggerated to the same geographical scale around the course, so as to produce an image of the racecourse that allows subsequent data to be easily presented in a visual fashion, all other proportions being kept geographically correct.

Once the base map for representing the going has been produced, the map is converted to a vector based image for high resolution presentation on electronic media, TV and/or paper.

Figure 2:
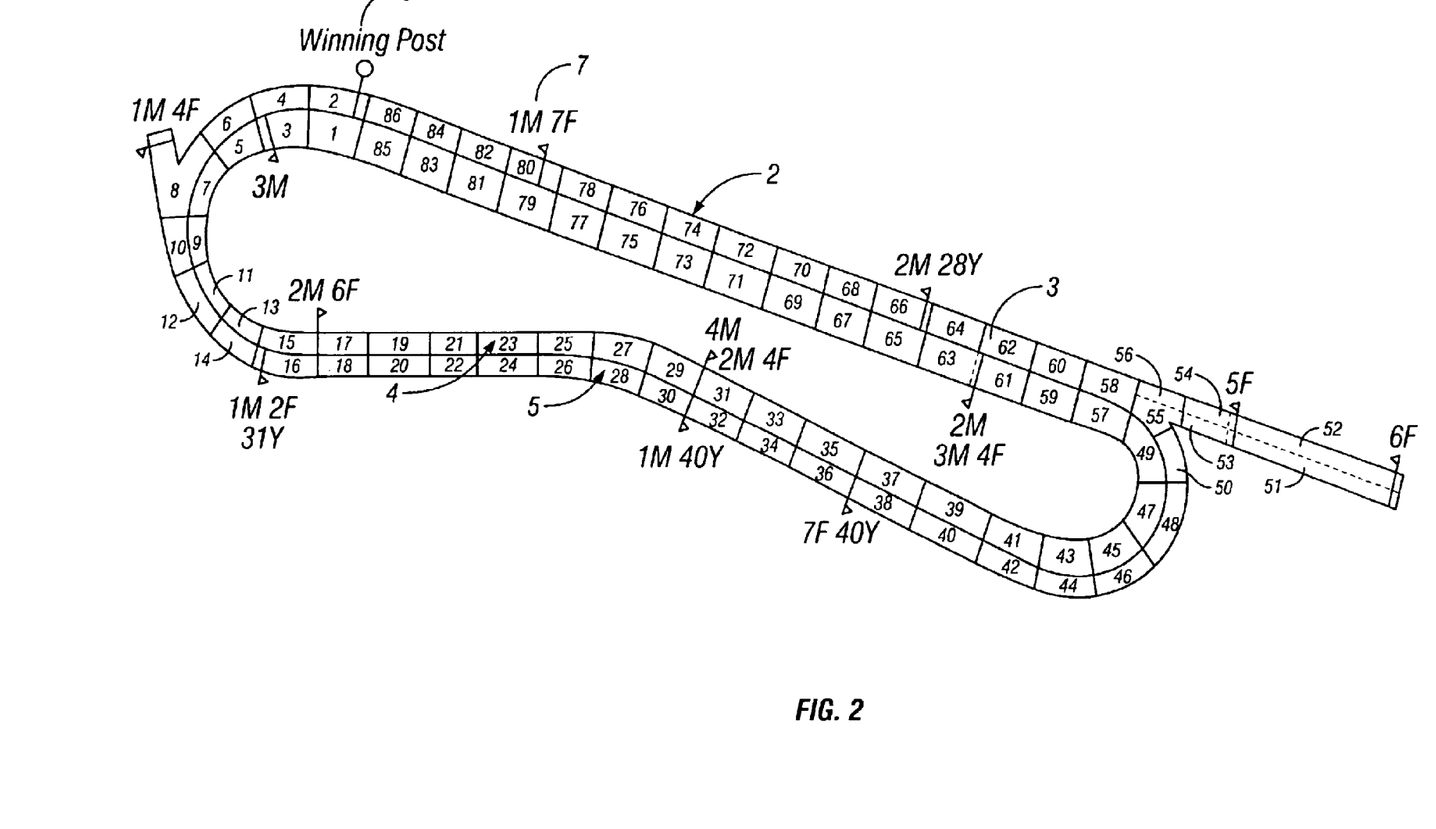
FIG. 2 is a base map of a racecourse showing the racecourse divided into zones according to the present invention.

Referring now to FIG. 2, a base map of Haydock Park racecourse is shown. The racecourse 2 is displayed sectioned into going zones 3, as described above, each zone being numbered according to the corresponding zone marker on the racecourse itself. The locations of the finishing point 6 and furlong markers 7 are also di splayed. The inner course 4 represents the Hurdle and Chase course, whereas the outer course 5 represents the flat course. Neither course has been sectioned across its width, with the exception of the run in from the number six furlong marker on the flat course. This is because this part of the racecourse has been identified as an area of change, where advantages may be gained from the particular draw of the horses, the draw being the starting stalls allocated to the horses.

Figure 3:
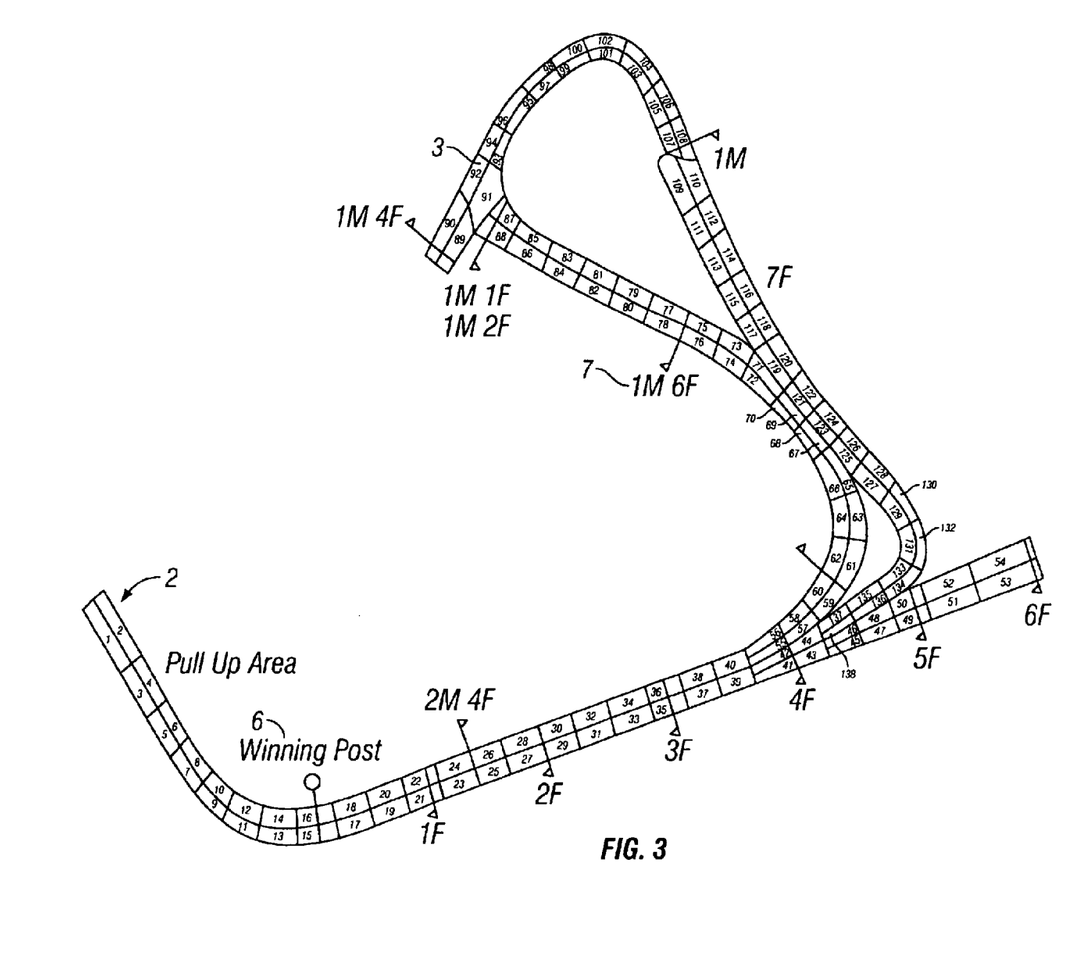
FIG. 3 is a base map of a different racecourse again shown divided into zones.

Referring now to FIG. 3, a base map of Goodwood racecourse, where there is only a flat racing course, is shown. Again the locations of the zones 3, finish point 6 and furlong markers 7 on the racecourse 2 are displayed. As this racecourse is known to be variable across its width the entire length of the course has been sectioned widthways.

Having sectioned the course into zones and produced a base map displaying the racecourse as sectioned, an assessment of the actual going in each zone is now required. Currently this assessment is still carried out by the Clerk of the Course.

There is no difference in the Clerk's actual method of assessment of going at a particular point. He starts at one end of the course, as before, and tests the ground of the course as he walks it. However, as zone markers have been placed around the course, when his testing indicates a change of going he record the zone he is in by reference to the markers around the course. The clerk will generally start at going point one and record his going assessment. The method of recording can be either manual or electronic. He continues to walk the course and notes the next going point where the going conditions have changed. For example this may be at marker thirty five. He continues around the course, noting all the places where the going changes until the course has been completed.

Figure 5:
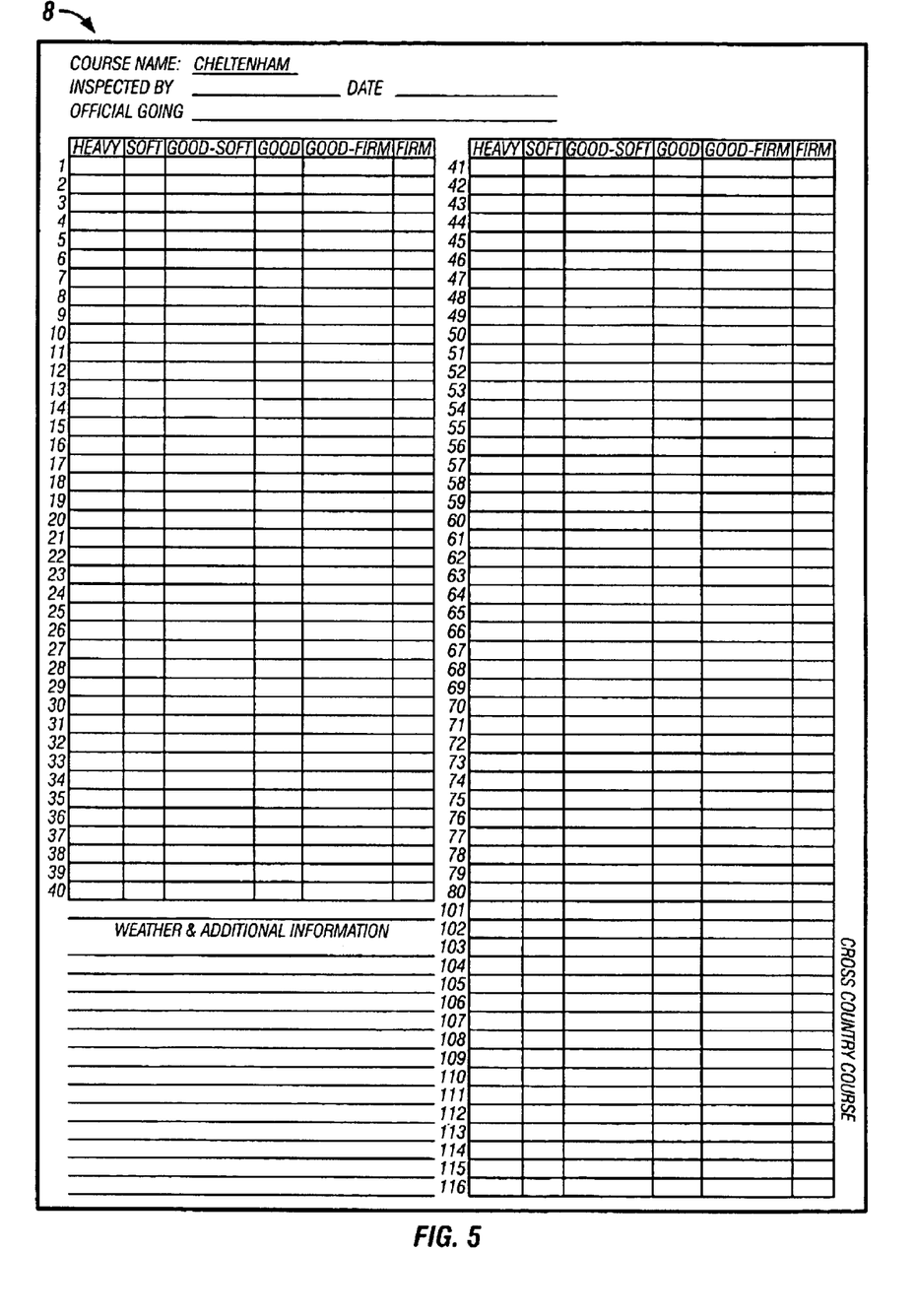
FIG. 5 is a manual submission sheet for use by the Clerk of the Course in transmitting going information.
Figure 6:
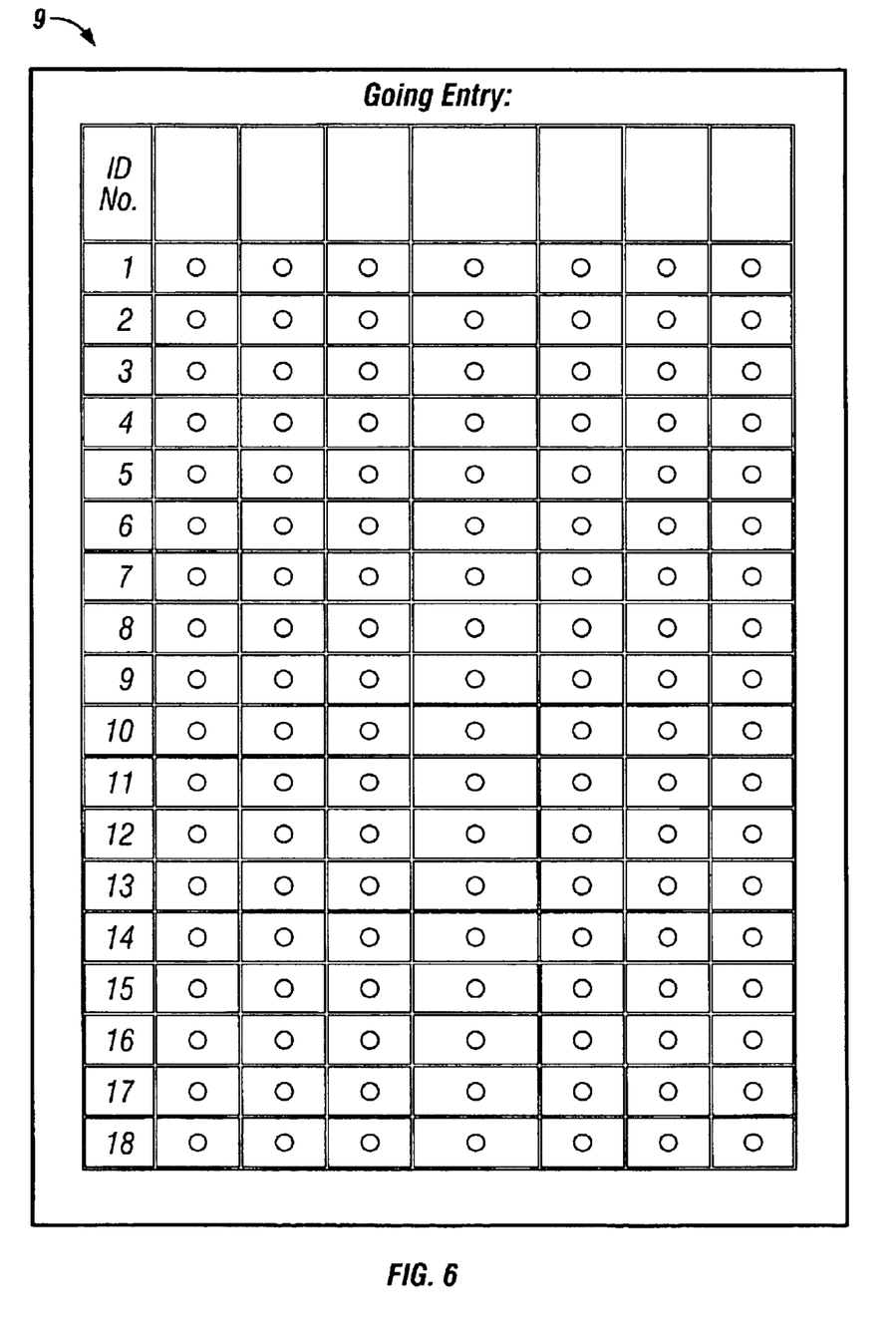
FIG. 6 is an html format submission sheet for use in transmitting going information.

The Clerk then transmits this information using any suitable means. FIG. 5 shows a manual submission sheet 8 suitable for faxing that can be used to transmit the data. Alternatively, referring now to FIG. 6, an HTML format submission sheet 9 located on a web page could be used. Other options include the Clerk providing the information verbally over the phone.

The going information received from the Clerk is then used to create a going map for the course, by assigning to each zone on the map the going attributed by the Clerk to the corresponding zone on the racecourse. For example, if a racecourse containing one hundred going points were assessed, the going being reported as "Good" at point one and changing at or near point thirty five to "Good to Firm", a going map of the course would display the section of the course covered by zones one to thirty four as "Good" and by Zones thirty five to one hundred as "Good to Firm", resulting in an official going of "Good to firm, Good in Places".

The proportions of the course under each going condition are calculated as a consequence of the zoning operation. Although each zone may differ in size, when the zones are created, the area of each zone is recorded allowing the percentage coverage of each going to be rapidly calculated at the time of the report.

Although the method of the present invention has been described above in use with traditional methods of going assessment in mind, the method may equally be used with any method of assessing going, be it quantitative or qualitative.

Figure 4:
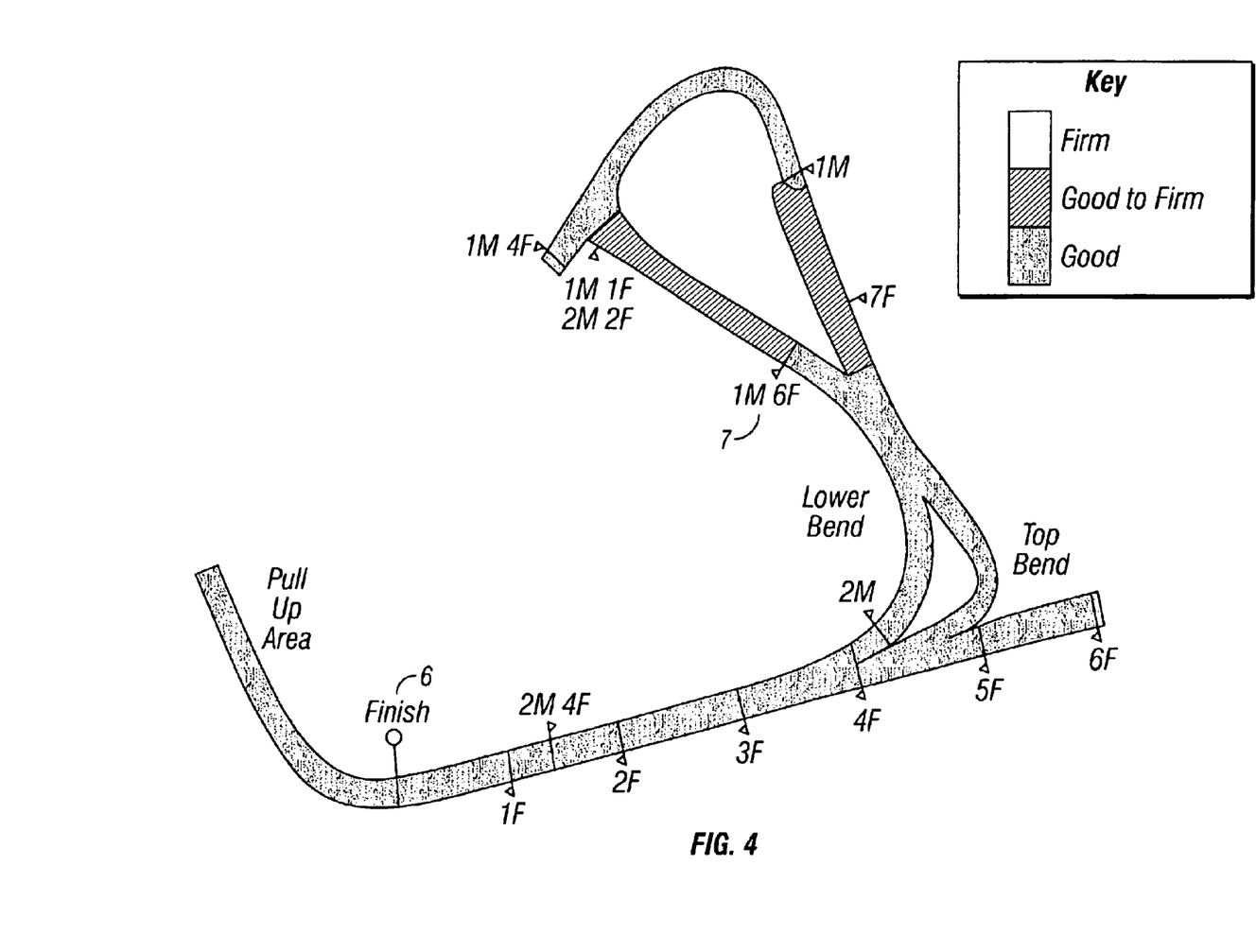
FIG. 4 is a going map of the racecourse shown in FIG. 3 displaying the going along the racecourse.

Referring now to FIG. 4 a second map of Goodwood racecourse is shown, with going along the racecourse now displayed according to a hatching code. As before, the finishing point 6 and furlong markers 7 are displayed. However, the divisions between zones are no longer displayed, in order to simplify the display for easier reading.

Going maps are preferably produced in three main formats:

1. Black and White Copy for faxing (preferably using British Telecom's Feature Fax)
2. Colour JPEG/EPS/GIF or other graphic format for emailing
3. Colour JPEG/GIF or other compressed digital file format for internet presentation.

The Fax map contains:
a. Time and date of report
b. Course name and logo
c. Official going statement
d. Black and white map
e. Shading key
f. Weather statement
g. Weather forecast
h. Additional course information
i. Clerks contact details Any other information may be displayed as required.

The email map contains all of the above, except that a colour map is produced instead of a black and white copy.

The Internet page contains all of the attributes indicated in the email copy, laid out for internet presentation in HTML format with relevant site menus.

The colour key used for displaying going in colour going maps is as follows:

1: Hard (Black)
2: Firm (Red)
3: Good to Firm (Orange)
4: Good (Green)
5: Good to Soft (Light Blue)
7: Soft (Magenta)
8: Heavy (Dark Blue)
9: Unraceable (White)

Suitable methods of hatching are used for the display of black and white maps.

Faxed reports are printed direct to fax from a PC. Email reports comprise a short note and an image of the colour going report attached. Internet presentation is structured for each course on the website used.

An archive of past going reports is maintained for internet presentation. A selected number of past reports can be made available without request, with the remainder available by request only. This information is stored in a database along with all other necessary course information.

The foregoing broadly describes the present invention, without limitation. Variations and modifications as will be apparent to those of ordinary skill in this art are intended to be comprised within the scope of this application and subsequent patent(s).

What is claimed is:

1. A method of mapping the going conditions for a racecourse comprising the steps of:
   a. surveying the racecourse soil conductivity over the course using soil conductivity measuring means;
   b. mapping the conductivity data produced by the conductivity measuring means according to the locations at which the conductivity data were obtained, so as to produce a map of the racecourse showing variations in soil conductivity;
   c. sectioning the racecourse along its length so as to produce a series of zones, wherein the variations shown in the soil conductivity map are utilized in choosing the zones;
   d. determining the going condition in each zone; and
   e. producing a map of the racecourse displaying the going conditions along the racecourse.

2. A method according to claim 1 wherein in carrying out step (c) additional factors, including the positioning of any underground water pipes, drainage or irrigation systems, differing levels of usage of different parts of the racecourse, or historical data indicating that certain parts of the racecourse provide an advantage under certain soil conditions, are also taken into account in choosing the zones.

3. A method according to claim 1 wherein the racecourse is sectioned such that parts of the course showing greater variation in soil conductivity are provided with zones of similar size.

4. A method according to claim 1 wherein for at least part of the racecourse the zones chosen result in the course being sectioned along its width as well as its length.

5. A method according to claim 1 wherein the racecourse is sectioned by placing zone markers around the course according to the desired positioning of the zones.

6. A method according to claim 5 wherein each zone marker represents the center of a side edge of a zone.

7. A method according to claim 5 wherein the location of each zone marker is recorded, this data being used to create a base map of the racecourse showing the position of the various zones, the base map being for subsequent use in producing the going conditions map.

8. A method according to claim 7 wherein the production of a map showing going conditions in step (e) comprises shading or colouring the zones of the base map according to the going information received, different shades or colours equipment to different going conditions.

9. A method according to claim 1 wherein the location of any furlong markers and start and finish points are also recorded and displayed on the going condition map.

10. A method according to claim 1 wherein all location data is obtained using a GPS receiver in communication with a data processor equipped with suitable software.

11. A method according to claim 1 wherein the going condition map exaggerates to a constant scale the width of the racecourse in order to facilitate visual interpretation of the map.

12. A going map produced according to a method comprising the steps of:
   a. surveying the racecourse soil conductivity over the course using soil conductivity measuring means;
   b. mapping the conductivity data produced by the conductivity measuring means according to the locations at which the conductivity data were obtained, so as to produce a map of the racecourse showing variations in soil conductivity;
   c. sectioning the racecourse along its length so as to produce a series of zones, wherein the variations shown in the soil conductivity map are utilized in choosing the zones;
   d. determining the going condition in each zone; and producing a map of the racecourse displaying the going conditions along the racecourse.

13. A base map of a racecourse showing the racecourse sectioned into a plurality of zones, the base map produced according to a method comprising steps of:
   a. surveying the racecourse soil conductivity over the course using soil conductivity measuring means;
   b. mapping the conductivity data produced by the conductivity measuring means according to the locations at which the conductivity data were obtained, so as to produce a map of the racecourse showing variations in soil conductivity;
   c. sectioning the racecourse along its length so as to produce a series of zones, wherein the variations shown in the soil conductivity map are utilized in choosing the zones; and
   d. producing a map of the racecourse displaying the said zones.

* * * * *